(12) United States Patent
Mau et al.

(10) Patent No.: US 7,603,103 B1
(45) Date of Patent: *Oct. 13, 2009

(54) BANDED BILLING AND ASSOCIATED INVOICE GENERATION FOR COMMUNICATION SERVICE

(75) Inventors: Jeffery Mau, Kansas City, MO (US); Jesse M. Kates, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 639 days.

This patent is subject to a terminal disclaimer.

(21) Appl. No.: 11/406,753

(22) Filed: Apr. 19, 2006

Related U.S. Application Data

(60) Provisional application No. 60/686,828, filed on Jun. 2, 2005.

(51) Int. Cl.
*H04M 11/00* (2006.01)

(52) U.S. Cl. .................. 455/406; 379/132; 705/40; 725/1; 725/5; 725/8

(58) Field of Classification Search .......... 455/406; 705/40; 725/1, 5, 8
See application file for complete search history.

(56) References Cited

U.S. PATENT DOCUMENTS

| | | | |
|---|---|---|---|
| 4,538,030 A * | 8/1985 | Fossett et al. .......... 379/115.01 |
| 5,749,052 A * | 5/1998 | Hidem et al. ................ 455/406 |
| 6,044,138 A * | 3/2000 | Graham et al. ......... 379/114.03 |
| 6,052,447 A | 4/2000 | Golden et al. |
| 6,182,054 B1 | 1/2001 | Dickinson et al. |
| 6,301,471 B1 | 10/2001 | Dahm et al. |
| 6,317,493 B1 * | 11/2001 | Little et al. ............ 379/207.04 |
| 6,327,466 B1 | 12/2001 | Savolainen |
| 6,353,736 B1 | 3/2002 | Hiromichi |
| 6,377,938 B1 * | 4/2002 | Block et al. ................... 705/32 |
| 6,512,751 B1 | 1/2003 | Struhsaker et al. |
| 6,556,917 B1 | 4/2003 | Wawra et al. |
| 6,574,465 B2 | 6/2003 | Marsh et al. |
| 6,597,903 B1 | 7/2003 | Dahm et al. |
| 6,606,377 B2 | 8/2003 | Ruckart et al. |
| 6,615,034 B1 | 9/2003 | Alloune et al. |
| 6,947,723 B1 | 9/2005 | Gurnani et al. |

(Continued)

OTHER PUBLICATIONS eBucks, Press Clipping, "Sliding scale fee structure gives way to 'simple banded' fees," http://www.itweb.co.za/office/ebucks/clipping 10.htm, printed from the World Wide Web on Jan. 21, 2004.

(Continued)

*Primary Examiner*—Lester Kincaid
*Assistant Examiner*—Diego Herrera

(57) ABSTRACT

An improved billing system for communication service is disclosed. A printed and/or online invoice will be generated for a subscriber's account and will be structured to include a visual gauge that depicts the extent of use for the billing period at issue. More particularly, the visual gauge will take the form of a table or listing that shows a continuum of possible time-increment or data-increment-ranges and that shows, for each range, the associated cost. The visual gauge will then include a visual marker that highlights or otherwise points out the increment-range into which the subscriber's use fell in the billing period at issue. Conveniently, the invention thus enables a subscriber to readily visualize where the subscriber's use fell within the continuum of possible increment-ranges.

17 Claims, 14 Drawing Sheets

| Banded-Pricing Schedule A | | |
|---|---|---|
| Low | High | Monthly Cost |
| 0 | 300 | $35.00 |
| 301 | 325 | $37.50 |
| 326 | 350 | $40.00 |
| 351 | 375 | $42.50 |
| 376 | 400 | $45.00 |
| 401 | 425 | $47.50 |
| 426 | 450 | $50.00 |
| 451 | 475 | $52.50 |
| 476 | 500 | $55.00 |
| 501 | 525 | $57.50 |
| 526 | 550 | $60.00 |
| 551 | 575 | $62.50 |
| 576 | 600 | $65.00 |
| 601 | 625 | $67.50 |
| 626 | 650 | $70.00 |
| 651 | 700 | $72.50 |
| 701 | 750 | $75.00 |
| 751 | 800 | $77.50 |
| 801 | 850 | $80.00 |
| 851 | 900 | $82.50 |
| 901 | 950 | $85.00 |
| 951 | 1,000 | $87.50 |
| 1,001 | 1,050 | $90.00 |
| 1,051 | 1,100 | $92.50 |
| 1,101 | 1,150 | $95.00 |
| 1,151 | 1,200 | $97.50 |
| 1,201 | 1,250 | $100.00 |
| Additional Minutes: $0.07 per minute | | |

U.S. PATENT DOCUMENTS

| | | |
|---|---|---|
| 7,054,665 B2 * | 5/2006 | Turner .................. 455/565 |
| 7,177,837 B2 * | 2/2007 | Pegaz-Paquet et al. ........ 705/40 |
| 2002/0194077 A1 | 12/2002 | Dutta |
| 2003/0050044 A1 | 3/2003 | Awada et al. |
| 2003/0153298 A1 * | 8/2003 | Eder et al. .................. 455/406 |
| 2003/0232614 A1 | 12/2003 | Squibbs |
| 2004/0009761 A1 | 1/2004 | Money et al. |
| 2004/0024702 A1 * | 2/2004 | Angel et al. .................. 705/40 |
| 2004/0043754 A1 * | 3/2004 | Whewell .................... 455/408 |
| 2004/0064410 A1 * | 4/2004 | Kight et al. .................. 705/40 |
| 2004/0235451 A1 | 11/2004 | Whewell et al. |
| 2004/0242262 A1 * | 12/2004 | Turner ...................... 455/550.1 |
| 2005/0033691 A1 | 2/2005 | Whewell et al. |
| 2005/0037731 A1 | 2/2005 | Whewell et al. |
| 2005/0044018 A1 | 2/2005 | Whewell |
| 2005/0086138 A1 * | 4/2005 | Prange ........................ 705/34 |

OTHER PUBLICATIONS

Nextel, Rate Plans, http://nextelonline.nextel.com/NASApp/onlinestore/Action/EnterZipCode, printed from the World Wide Web on Apr. 12, 2004.

Nextel, Flex Plans, http://nextelonline.nextel.com/phones_plans/flexplans_value_popup.html, printed from the World Wide Web on Apr. 12, 2004.

Nextel, Price Plan Details, http://nextelonline.nextel.com/NASApp/onlinestore/Action/RatePlanDetails?PLAN_ID=ARR12501&zipCode=43085, printed from the World Wide Web on Apr. 12, 2004.

Call Center Plus, "Pricing," http://callcenterplus.com/pricing.html, printed from the World Wide Web on Jan. 21, 2004.

* cited by examiner

| Banded-Pricing Schedule A |||
| Low | High | Monthly Cost |
| --- | --- | --- |
| 0 | 300 | $35.00 |
| 301 | 325 | $37.50 |
| 326 | 350 | $40.00 |
| 351 | 375 | $42.50 |
| 376 | 400 | $45.00 |
| 401 | 425 | $47.50 |
| 426 | 450 | $50.00 |
| 451 | 475 | $52.50 |
| 476 | 500 | $55.00 |
| 501 | 525 | $57.50 |
| 526 | 550 | $60.00 |
| 551 | 575 | $62.50 |
| 576 | 600 | $65.00 |
| 601 | 625 | $67.50 |
| 626 | 650 | $70.00 |
| 651 | 700 | $72.50 |
| 701 | 750 | $75.00 |
| 751 | 800 | $77.50 |
| 801 | 850 | $80.00 |
| 851 | 900 | $82.50 |
| 901 | 950 | $85.00 |
| 951 | 1,000 | $87.50 |
| 1,001 | 1,050 | $90.00 |
| 1,051 | 1,100 | $92.50 |
| 1,101 | 1,150 | $95.00 |
| 1,151 | 1,200 | $97.50 |
| 1,201 | 1,250 | $100.00 |
| Additional Minutes: $0.07 per minute |||

FIG. 2

| Banded-Pricing Schedule B |||
|---|---|---|
| Low | High | Monthly Cost |
| 0 | 300 | $35.00 |
| 301 | 325 | $38.00 |
| 326 | 350 | $41.00 |
| 351 | 375 | $44.00 |
| 376 | 400 | $47.00 |
| 401 | 425 | $50.00 |
| 426 | 450 | $53.00 |
| 451 | 475 | $56.00 |
| 476 | 500 | $59.00 |
| 501 | 525 | $62.00 |
| 526 | 550 | $65.00 |
| 551 | 575 | $68.00 |
| 576 | 600 | $71.00 |
| 601 | 625 | $74.00 |
| 626 | 650 | $77.00 |
| 651 | 675 | $78.50 |
| 676 | 700 | $80.00 |
| 701 | 725 | $81.50 |
| 726 | 750 | $83.00 |
| 751 | 775 | $84.50 |
| 776 | 800 | $86.00 |
| 801 | 825 | $87.50 |
| 826 | 850 | $89.00 |
| 851 | 875 | $90.50 |
| 876 | 900 | $92.00 |
| 901 | 925 | $93.50 |
| 926 | 950 | $95.00 |
| Additional Minutes: $0.07 per minute |||

FIG. 3

| Banded-Pricing Schedule A ||| 
|---|---|---|
| Low | High | Monthly Cost |
| 0 | 5,000 | $10.00 |
| 5,001 | 5,500 | $10.75 |
| 5,501 | 6,000 | $11.50 |
| 6,001 | 6,500 | $12.25 |
| 6,501 | 7,000 | $13.00 |
| 7,001 | 7,500 | $13.75 |
| 7,501 | 8,000 | $14.50 |
| 8,001 | 8,500 | $15.25 |
| 8,501 | 9,000 | $16.00 |
| 9,001 | 9,500 | $16.75 |
| 9,501 | 10,000 | $17.50 |
| 10,001 | 10,500 | $18.25 |
| 10,501 | 11,000 | $19.00 |
| 11,001 | 11,500 | $19.75 |
| 11,501 | 12,000 | $20.50 |
| 12,001 | 13,000 | $21.25 |
| 13,001 | 14,000 | $22.00 |
| 14,001 | 15,000 | $22.75 |
| 15,001 | 16,000 | $23.50 |
| 16,001 | 17,000 | $24.25 |
| 17,001 | 18,000 | $25.00 |
| 18,001 | 19,000 | $25.75 |
| 19,001 | 20,000 | $26.50 |
| 20,001 | 21,000 | $27.25 |
| 21,001 | 22,000 | $28.00 |
| 22,001 | 23,000 | $28.75 |
| 23,001 | 24,000 | $29.50 |

FIG. 6

| Banded-Pricing Schedule B | | |
|---|---|---|
| Low | High | Monthly Cost |
| 0 | 5,000 | $10.00 |
| 5,001 | 5,500 | $11.00 |
| 5,501 | 6,000 | $12.00 |
| 6,001 | 6,500 | $13.00 |
| 6,501 | 7,000 | $14.00 |
| 7,001 | 7,500 | $15.00 |
| 7,501 | 8,000 | $16.00 |
| 8,001 | 8,500 | $17.00 |
| 8,501 | 9,000 | $18.00 |
| 9,001 | 9,500 | $19.00 |
| 9,501 | 10,000 | $20.00 |
| 10,001 | 10,500 | $21.00 |
| 10,501 | 11,000 | $22.00 |
| 11,001 | 11,500 | $23.00 |
| 11,501 | 12,000 | $24.00 |
| 12,001 | 12,500 | $24.50 |
| 12,501 | 13,000 | $25.00 |
| 13,001 | 13,500 | $25.50 |
| 13,501 | 14,000 | $26.00 |
| 14,001 | 14,500 | $26.50 |
| 14,501 | 15,000 | $27.00 |
| 15,001 | 15,500 | $27.50 |
| 15,501 | 16,000 | $28.00 |
| 16,001 | 16,500 | $28.50 |
| 16,501 | 17,000 | $29.00 |
| 17,001 | 17,500 | $29.50 |
| 17,501 | 18,000 | $30.00 |

FIG. 7

| Sprint. | | | | Sprint PCS® |
|---|---|---|---|---|
| Customer | Account Number | Invoice Period | Invoice Date | Page |
| JOHN Q. PUBLIC | XXXXXXXXXX-X | Jun 1 - Jun 30 | Jul 1, 2005 | 2 of 5 |

Sprint PCS Fair & Flexible Charges

| Anytime Minutes | Tier Charge |
|---|---|
| 0-300 | Included |
| 301-325 | $2.50 |
| 326-350 | 5.00 |
| 351-375 | 7.50 |
| 376-400 | 10.00 |
| 401-425 | 12.50 |
| 426-450 | 15.00 |
| 451-475 | 17.50 |
| 476-500 | 20.00 |
| 501-525 | 22.50 |
| 526-550 | 25.00 |
| 551-575 | 27.50 |
| 576-600 | 30.00 |
| 601-625 | 32.50 |
| 626-650 | 35.00 |
| 651-700 | 37.50 |
| 701-750 | 40.00 |
| 751-800 | 42.50 |
| 801-850 | 45.00 |
| 851-900 | 47.50 |
| 901-950 | 50.00 |
| 951-1000 | 52.50 |
| 1001-1050 | 55.00 |
| 1051-1100 | 57.50 |
| 1101-1150 | 60.00 |
| 1151-1200 | 62.50 |
| 1201-1250 | 65.00 |
| >1250 | .07/min |

Anytime Minutes Used: 1305

| | |
|---|---|
| Minimum Monthly Charge | $35.00 |
| Additional Anytime Minute Tier 1201-1250 | 65.00 |
| Additional Anytime Minutes Used* | 3.50 |
| America - Roaming | 5.00 |
| 7PM Nights & Weekends | 5.00 |
| | $113.50 |

*See Additional Usage section for details

Note: Assumes no proration or sharing

FIG. 10

Sprint. Sprint PCS®

| Customer | Account Number | Invoice Period | Invoice Date | Page |
|---|---|---|---|---|
| JOHN Q. PUBLIC | XXXXXXXXXX-X | Jun 1 - Jun 30 | Jul 1, 2005 | 3 of 5 |

Sprint PCS Fair & Flexible Charges

Anytime Minutes Used: 601

| Anytime Minutes | Tier Charge |
|---|---|
| 0-300 | Included |
| 301-325 | $2.50 |
| 326-350 | 5.00 |
| 351-375 | 7.50 |
| 376-400 | 10.00 |
| 401-425 | 12.50 |
| 426-450 | 15.00 |
| 451-475 | 17.50 |
| 476-500 | 20.00 |
| 501-525 | 22.50 |
| 526-550 | 25.00 |
| 551-575 | 27.50 |
| 576-600 | 30.00 |
| 601-625 | 32.50 |
| 626-650 | 35.00 |
| 651-700 | 37.50 |
| 701-750 | 40.00 |
| 751-800 | 42.50 |
| 801-850 | 45.00 |
| 851-900 | 47.50 |
| 901-950 | 50.00 |
| 951-1000 | 52.50 |
| 1001-1050 | 55.00 |
| 1051-1100 | 57.50 |
| 1101-1150 | 60.00 |
| 1151-1200 | 62.50 |
| 1201-1250 | 65.00 |
| >1250 | .07/min |

*Note: Assumes proration*

FIG. 11

Sprint PCS®

| Customer | Account Number | Invoice Period | Invoice Date | Page |
|---|---|---|---|---|
| JOHN Q. PUBLIC | XXXXXXXXX-X | Jun 1 - Jun 30 | Jul 1, 2005 | 4 of 5 |

Sprint PCS Fair & Flexible Charges

| Anytime Minutes | Tier Charge |
|---|---|
| 0-300 | Included |
| 301-325 | $2.50 |
| 326-350 | 5.00 |
| 351-375 | 7.50 |
| 376-400 | 10.00 |
| 401-425 | 12.50 |
| 426-450 | 15.00 |
| 451-475 | 17.50 |
| 476-500 | 20.00 |
| 501-525 | 22.50 |
| 526-550 | 25.00 |
| 551-575 | 27.50 |
| 576-600 | 30.00 |
| 601-625 | 32.50 |
| 626-650 | 35.00 |
| 651-700 | 37.50 |
| 701-750 | 40.00 |
| 751-800 | 42.50 |
| 801-850 | 45.00 |
| 851-900 | 47.50 |
| 901-950 | 50.00 |
| 951-1000 | 52.50 |
| 1001-1050 | 55.00 |
| 1051-1100 | 57.50 |
| 1101-1150 | 60.00 |
| 1151-1200 | 62.50 |
| 1201-1250 | 65.00 |
| >1250 | .07/min |

Shared Anytime Minutes Used: 1305

| | |
|---|---|
| Minimum Monthly Charge | $35.00 |
| Additional Anytime Minute Tier 1201-1250 | 65.00 |
| Additional Anytime Minutes Used* | 3.50 |
| America - Roaming included | 5.00 |
| 7PM Nights & Weekends | 5.00 |
| | $113.50 |

*See Additional Usage section for details

Reminder
This section shows Fair & Flexible usage for all the phones sharing minutes on your account.

*Note: Assumes sharing*

FIG. 12

Sprint.
Sprint PCS®

| Customer | Account Number | Invoice Period | Invoice Date | Page |
|---|---|---|---|---|
| JOHN Q. PUBLIC | XXXXXXXXXX-X | Jun 1 - Jun 30 | Jul 1, 2005 | 5 of 5 |

Sprint PCS Fair & Flexible Charges

| Anytime Minutes | Tier Charge |
|---|---|
| 0-300 | Included |
| 301-325 | $2.50 |
| 326-350 | 5.00 |
| 351-375 | 7.50 |
| 376-400 | 10.00 |
| 401-425 | 12.50 |
| 426-450 | 15.00 |
| 451-475 | 17.50 |
| 476-500 | 20.00 |
| 501-525 | 22.50 |
| 526-550 | 25.00 |
| 551-575 | 27.50 |
| 576-600 | 30.00 |
| 601-625 | 32.50 |
| 626-650 | 35.00 |
| 651-700 | 37.50 |
| 701-750 | 40.00 |
| 751-800 | 42.50 |
| 801-850 | 45.00 |
| 851-900 | 47.50 |
| 901-950 | 50.00 |
| 951-1000 | 52.50 |
| 1001-1050 | 55.00 |
| 1051-1100 | 57.50 |
| 1101-1150 | 60.00 |
| 1151-1200 | 62.50 |
| 1201-1250 | 65.00 |
| >1250 | .07/min |

Shared Anytime Minutes Used: 554

Reminder
This section shows Fair & Flexible usage for all the phones sharing minutes on your account.

*Note: Assumes proration and sharing*

BANDED BILLING AND ASSOCIATED INVOICE GENERATION FOR COMMUNICATION SERVICE

REFERENCE TO RELATED APPLICATIONS

This application claims priority to U.S. Provisional Patent Application No. 60/686,828, filed Jun. 2, 2005, the entirety of which is hereby incorporated by reference. In addition, the following co-pending applications are also hereby incorporated by reference: U.S. patent application Ser. No. 10/824,163, filed Apr. 14, 2004, and U.S. patent application Ser. No. 10/881,435, filed Jun. 29, 2004.

FIELD OF THE INVENTION

The present invention relates to communication service and, more particularly, to billing of subscribers for such service.

BACKGROUND

The present invention is an improvement of the inventions disclosed and claimed in U.S. patent application Ser. Nos. 10/824,163 and 10/881,435, each of which is directed to banded billing for telecommunication services.

As described in application Ser. No. 10/824,163, a service provider may maintain a banded pricing schedule that designates monthly charges corresponding with varying ranges (or "bands") of use per month. Each month, the service provider may then determine how many minutes or other increments a subscriber actually used and may refer to the banded pricing schedule to determine which range that number of minutes or other increments falls into and to identify a monthly charge for that range. The service provider may then apply that charge to the subscriber's account.

Similarly, as described in application Ser. No. 10/881,435, a service provider may maintain a banded pricing schedule that designates monthly charges corresponding with varying ranges (or "bands") of use per month. Each month, the service provider may then determine how many increments of data a subscriber communicated (sent and/or received) and may refer to the banded pricing schedule to determine which range that number of increments falls into and to identify a monthly charge for that range. The service provider may then apply that charge to the subscriber's account.

SUMMARY

In accordance with the present improvement, a printed and/or online invoice will be generated for the subscriber's account and will be structured to include a visual gauge that depicts the extent of use for the billing period at issue. Preferably, the visual gauge will take the form of a table or listing that shows a continuum of possible time-increment or data-increment-ranges and that shows, for each range, the associated cost. The invoice will then include a visual marker that highlights or otherwise points out the range into which the subscriber's use fell in the billing period at issue.

For instance, assuming 10 ranges of minutes are possible, the invoice can include a listing of the ranges, defining each range (e.g., "301-325 minutes", "326 to 350 minutes", etc.) and indicating for each range the associated total cost or incremental cost to the subscriber. The invoice can then highlight (e.g., in gray, in a contrasting color, or in a different font or other emphasis) the particular range into which the subscriber's use fell. Alternatively, the invoice can include an arrow, carrot, bracket, icon, or other visual marker that points to or otherwise designates the range into which the subscriber's use fell. In a preferred embodiment, the invoice will also include a summary section that specifically indicates the cost incurred for the range into which the subscriber's use fell, possibly together with other information of interest.

As presently contemplated, a computerized billing system will generate the improved invoice. For instance, as described in the patent applications incorporated above, the system may determine how many increments the subscriber used in the billing period at issue, the system may determine which range that number of increments falls in, and the system may determine the cost associated with that range. The system may then print a paper invoice for the subscriber, including on the paper invoice a continuum of increment-ranges, showing for each range a respective cost. And, in printing the invoice, the system may highlight or otherwise point out the range into which the subscriber's use fell. The printed invoice may then be delivered to the user. Alternatively, the system may generate a PDF, HTML or other electronic invoice similarly including a visual representation of a continuum of ranges, and visually indicating, on the continuum, the range into which the subscriber's use fell.

These as well as other aspects and advantages will become apparent to those of ordinary skill in the art by reading the following detailed description, with reference where appropriate to the accompanying drawings.

BRIEF DESCRIPTION OF THE DRAWINGS

FIGS. 2 and 3 are sample time-based banded-pricing schedules.

FIGS. 6 and 7 are sample data-quantity-based banded-pricing schedules.

FIGS. 9-13 are example invoice sheets including a visual gauge of increment-ranges in accordance with the exemplary embodiment.

DETAILED DESCRIPTION

1. Banded Billing

As noted above, application Ser. Nos. 10/824,163 and 10/881,435 describe examples of a banded billing conducted based on time and based on data quantity respectively. For the reader's convenience, the following subsection reviews the process described in application Ser. No. 10/824,163, and the next subsection reviews the process described in application Ser. No. 10/881,435. It should be understood, however, that these are merely examples, and that variations are possible.

a. Time-Based Banded Billing

Figure 1:
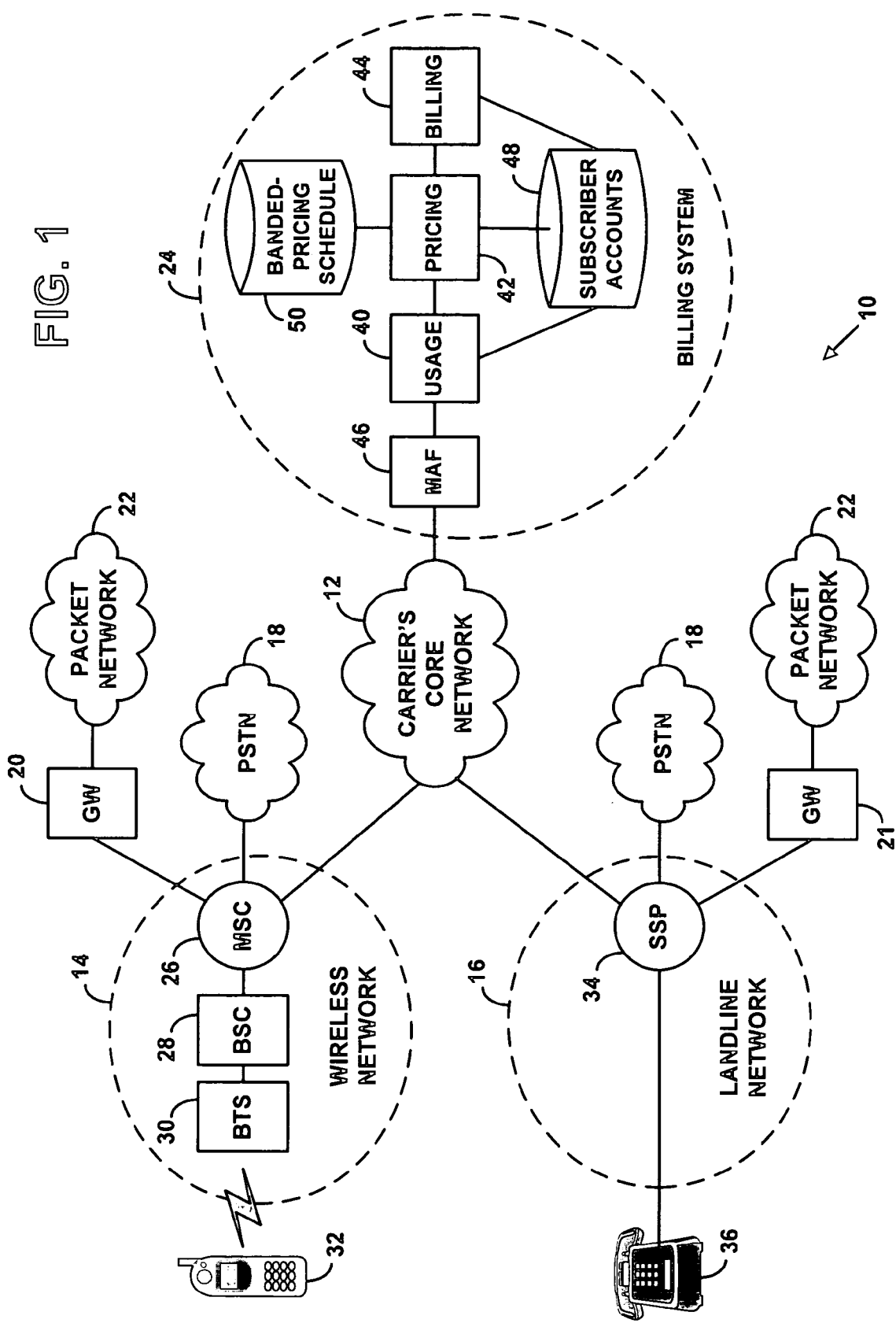
FIG. 1 is a block diagram of a telecommunication network in which an embodiment of the invention can be carried out.

Time-based banded billing can be carried out by a telecommunication service provider (carrier) or other entity, in order to charge subscribers for use of telecommunication service in a given period of time, such as monthly, bimonthly or quarterly, for instance. FIG. 1 depicts an example telecommunication network 10 that could be owned and operated by a service provider in order to provide telecommunication service and to carry out time-based banded billing functions.

Example network 10 of FIG. 1 includes a carrier's core network 12, such as an ATM and/or IP-based network. Connected with the core network 12 is then one or more access networks/systems, such as a wireless access network 14 and a landline access network 16, each of which may allow subscribers to engage in telecommunication services such as voice telephony and data communications. Each of the access networks is coupled, in turn, with one or more transport networks, such as the public switched telephone network (PSTN) 18 and (through a packet gateway 20, 21) a packet-switched network 22 (such as the Internet, or the carrier's core network 12). Further, also connected with the core network 12 is a billing system 24, which preferably carries out the banded billing process.

Each of the access networks shown by way of example in FIG. 1 includes a switch (or other analogous entity) that functions to connect calls or other communications between subscriber stations and transport networks. For instance, the wireless access network 14 includes a mobile switching center (MSC) 26 (e.g., a Nortel DMS-MSC), which, together with a base station controller (BSC) 28 and base transceiver station (BTS) 30, provides connectivity between one or more wireless subscriber stations (e.g., wireless communication device (WCD) 32) and one or more transport networks. And the landline access network 16 includes a service switching point (SSP) 34 (e.g., a Nortel DMS-100), which provides connectivity between one or more landline subscriber stations (e.g., landline telephone device 36) and one or more transport networks.

Wireless access network 14 may, more specifically, take the form of a cellular radio access network. Typically in such a network, one or more BTSs 30 would radiate to define one or more wireless coverage areas, such as cells and cell sectors, in which WCDs can operate. One or more BSCs 32 would then control air interface communications between the BTSs and the WCDs, such as to assign air interface traffic channels and facilitate handoff of communications between wireless coverage areas. In turn, one or more MSCs would control one or more BSCs and provide connectivity with one or more transport networks. Such a network could employ various types of air interface protocols, such as AMPS, TDMA, CDMA, GSM, 802.11, or other protocols now known or later developed.

Although FIG. 1 depicts in wireless access network 14 a single MSC, a single BSC and a single BTS, it should be understood that more than one of each might exist. Further, in some implementations, these components could be integrated together in various combinations. For instance, often the functions of the BSC and MSC are integrated into a single platform, which may or may not be co-located or integrated with a BTS. Still further, note that wireless access network 14 could take various other forms as well.

Landline access network 16, on the other hand, may take the form of a conventional telephone network. Such a network may include one or more local exchange carrier (LEC) switches. In a usual arrangement, a given LEC switch will reside at a LEC's central office (or at an equivalent location, such as a cable service provider's point of presence) and will serve a particular region of landline telephone subscribers, each coupled to the LEC switch by a local loop telephone line (e.g., twisted pair, fiber, coaxial cable, through one or more intermediate entities, such as digital concentrators, cable head-ends, etc.). SSP 34 shown in FIG. 1 could be a LEC switch or some other sort of switch or other entity that provides connectivity for landline subscriber stations. Further, landline access network 16 could take other forms as well.

In practice, a switch such as MSC 26 or SSP 34 may receive requests to set up calls to or from various subscriber stations and may responsively set up those calls, or cause the calls to be set up. For example, in the wireless access network 14, MSC 26 may receive an origination message transmitted from WCD 32 (via BTS 30 and BTS 28), seeking to initiate a call to a particular telephone number. In response, if the MSC 26 does not itself serve the called number, MSC 26 may engage in call setup signaling (such as ISUP signaling) through a signaling network (e.g., the carrier's core network 12, or another network) in an effort to set up the call. Alternatively, if the MSC 26 itself serves the number, then the MSC 26 may direct BSC 28 to ring the called device, and BSC 28 may do so. Once a communication path is ready between the MSC 26 and the called party, the MSC 26 may then connect the call through to the called party, and allow the call to proceed.

As another example, MSC 26 may receive a request from WCD 32 to establish data connectivity such as a wireless web session. In response, MSC 26 may engage in signaling with gateway 20, 21 to establish a packet network connectivity for the WCD 32 and may allow the WCD 32 to commence data communications.

As still another example, MSC 26 may receive a request from a signaling network seeking to set up a call to WCD 32. In response, MSC 26 may direct BSC 28 to ring WCD 32. BSC 28 may then send a page and alert message (via BTS 30) over an air interface control channel to WCD 32. When WCD 32 answers the call, MSC 26 may then allow the call to proceed.

Similarly, in the landline access network 16, SSP 34 may receive a request from landline telephone device 36 to initiate a call to a particular number. For instance, landline telephone device 36 may apply dialed digits to the local loop telephone line, which SSP 34 may receive directly or through one or more other entities. In response, if the SSP 34 does not serve the called number, SSP 34 may engage in call setup signaling (such as ISUP signaling) through a signaling network (e.g., the carrier's core network 12, or another network) in an effort to set up the call. Alternatively, if SSP 34 serves the called number, SSP 34 may itself ring that called line. Once a communication path is ready between the SSP 34 and the called party, the SSP 34 may then connect the call through to the called party, and allow the call to proceed.

And yet as another example, SSP 34 may receive a request from a signaling network seeking to set up a call to landline telephone device 36. In response, SSP 34 or another entity may apply a ring signal on the local loop telephone line to device 36, to cause device 36 to ring. When device 36 answers the call, SSP 34 may then allow the call to proceed.

Although not shown in FIG. 1, note that other switches may be present in the telecommunication network 10 as well. For instance, an inter-exchange carrier (IXC) may provide a switch (e.g., Nortel DMS-250) that serves a connection between LEC switches, MSCs or other regional telecommunication systems, so as to facilitate long distance and other inter-switch calling. As another example, private switches (e.g., PBX servers) might be provided to serve enterprises or other groups of subscribers (e.g., hotels, campuses, etc.) Other examples are possible as well.

Conventionally, a switch (such as an MSC, an LEC switch, an IXC switch, or a PBX server, for instance) will also track subscriber usage, to facilitate billing and performance monitoring. To do so, for each call that the switch handles, the switch will generate a Call Detail Record (CDR). The CDR may take various forms but often includes certain minimum information about the call, such as the originating number, terminating number, start time, stop time, call duration, and call type (e.g., landline, wireless-wireless, long distance, voice, data (e.g., if routed to gateway 20, 21), etc.) Each CDR is typically formatted as a database record with predefined fields.

To ensure billing of the correct party (or parties) for a given call, certain switches may also be programmed to query a Numbering Management System (NMS) (not shown) so as to determine whether the originating number, terminating number or both are subscribers of the carrier's system, and the switch may flag the subscriber number(s) in the CDR. (Note that in a wireless roaming scenario, where a mobile station subscribes to a given carrier's service but operates in another carrier's system, the serving carrier may treat the roaming station as a roaming subscriber, for purposes of generating CDRs, and for later collection of payment from the mobile station's true carrier. In that situation, the serving carrier may deliver CDRs or associated usage data to the subscriber's carrier, to facilitate billing.)

A switch may be programmed to record call duration in each CDR with a desired level of accuracy. For instance, a switch could be programmed to record call duration in minutes and seconds (and even fractions of seconds). And as another example, a switch could be programmed to round call duration to the nearest whole minute and to record that whole minute count in the CDR. Further, a switch may be programmed to record a special call duration for particular calls. For instance, a switch could be programmed to record a duration of zero for calls placed between two of the carrier's subscribers (e.g., mobile-to-mobile calls), for calls placed to the carrier's customer service center or to other special destinations, or for calls that experienced system disconnects. Other examples are possible as well.

Periodically, or in response to a triggering event (such as generation of each CDR, or receipt of a request from the billing system 24), a switch may programmatically send to the billing system 24 the CDRs that it has generated. Based on the CDRs, subscriber service plans, and perhaps other data, the billing system 24 will then compute and apply charges to subscriber accounts. On a recurring basis, such as every month, every other month, or quarterly, for instance, the billing system may then generate subscriber invoices and send the invoices to subscribers for payment.

Billing system 24 can take various forms. In a preferred embodiment, for instance, the billing system 24 may comprise a number of subsystems, each of which could take the form of one or more programmed computers (e.g., computers with microprocessors and data storage (e.g., one or more volatile or non-volatile storage media, in one or more computers or other devices), and with machine language instructions (program logic) stored in the data storage and executable by the microprocessors), and all of which could reside on a local area network or could be connected together in some other way. As shown by way of example in FIG. 1, the subsystems may include a usage subsystem 40, a pricing subsystem 42, and a billing subsystem 44. Further, the billing system 24 may include a Message Acquisition and Formatter (MAF) 46 (e.g., a computer server) to buffer CDRs entering the billing system, and a subscriber account store 48 to hold subscriber accounts, such as records of usage and service plan and payment information.

As CDRs arrive at the billing system 24 from one or more switches or other entities, the MAF queues the CDRs and sends them downstream to the usage subsystem 40. Upon receipt of each CDR, the usage subsystem 40 reformats the CDR into a format used by the billing system (e.g., omitting unnecessary information) if necessary and calculates minutes of use for the call. The usage subsystem then records those minutes of use into the appropriate subscriber account record in account store 48.

Given a CDR, the usage subsystem 40 could be arranged to calculate minutes of use (MOU) in various ways, possibly depending on the type of information provided in the CDR and upon one or more other factors. For instance, if the CDR includes an indication of call duration, the usage subsystem 40 might use the indicated call duration or some variant thereof as the MOU for the call. Alternatively, if the CDR includes just start and stop times, the usage subsystem 40 might compute a call duration as the difference between the start and stop times and then use that call duration or some variant thereof as the MOU for the call. Further, the usage subsystem 40 may refer to subscriber profile records (which might be stored in account store 48 or elsewhere) to determine if special MOU calculations should be made for particular subscribers. Still further, the usage subsystem 40 might perform different MOU calculations depending on time, day or date or still other factors.

As a specific example, the usage subsystem 40 could simply read or compute an actual call duration (including minutes and seconds) from a CDR (i.e., extract a call duration from the CDR) and treat that call duration as the MOU. As another example, the usage subsystem 40 could determine a call duration from the CDR, round that duration up to the nearest whole minute, and treat the rounded number of minutes as the MOU for the call. (Note that rounding call duration up to the nearest whole minute effectively treats any partial minute at the end of the call as a whole minute.) And as yet another example, the usage subsystem 40 could apply special MOU-calculation rules for particular types of calls or particular subscribers, such as (i) concluding that any call between two subscribers in the carrier's network (e.g., mobile-to-mobile calls) had zero MOU, (ii) concluding that any call to the carrier's customer service center or to other special destinations had zero MOU, or (ii) adjusting the MOU for a given call due to a service level of the caller, or for promotional purposes or other reasons. Other examples are possible as well.

As the usage subsystem 40 records the MOU for a given call into the appropriate record in account store 48, the usage subsystem 40 may update a total number of minutes used for that account during the current billing period (e.g., month, quarter, etc.) Alternatively, the usage subsystem 40 may simply record in the subscriber account an indication of MOU together with a description of the call (e.g., called number, time of call, etc.)

At the end of the billing period for the subscriber or at another designated time, the pricing subsystem 42 will next apply a banded-billing process so as to determine a charge for the minutes that the subscriber used during the billing period. Note that, for a given subscriber account, the pricing subsystem 42 could perform this function separately for different categories of calls, such as for wireless, landline, long distance calls, voice, data, or other sorts of calls, and the pricing subsystem 42 could produce separate charges for each category of calls. Alternatively, the pricing subsystem 42 could perform this function cumulatively for all types of calls, thus producing a cumulative charge to the subscriber.

In order to carry out the banded-billing process, the billing system will preferably maintain in data storage a banded-pricing schedule 50, which specifies minute-ranges and respective costs. More particularly, the banded-pricing schedule 50 will preferably take the form of a stored table that divides a continuum of minutes of use into a series of contiguous, mutually-exclusive minute-ranges and that specifies for each minute-range a respective cost.

Preferably, the continuum of minutes of use will start at a low end of zero minutes and extend to a designated high end, such as 1,250 minutes for instance. Further, each of a plurality of the minute-ranges listed in the table (e.g., every minute-range) will preferably span multiple minutes, such as 25, 50 or 100 minutes for instance. Yet further, the various minute-ranges in the table can be the same size as each other or can vary in size from each other.

FIGS. 2 and 3 illustrate some example banded-pricing schedules, although it should be understood that other examples are possible as well. Each table is structured with three columns and multiple rows, with each row identifying a particular minute-range and specifying a respective monthly cost for the minute-range. More particularly, for each minute-range, the first and second columns set forth the upper and lower limits of the minute-range and the third column sets forth the cost for use that falls within those limits.

The banded-pricing schedule of FIG. 2 begins with a lowest range of 0 to 300 minutes, then continues with 25-minute ranges through 650 minutes, and then continues with 50-minute ranges through 1,250 minutes. For the first minute-range, the schedule assigns a cost of $35.00, and for each subsequent minute-range, the schedule increases the monthly cost by $2.50.

Algorithmically, this schedule is an example of one that has a first minute-range of 0 to P minutes, that then continues with N minute-ranges $R_k$ each extending from $\{P+(k-1)(Q)+1\}$ minutes to $\{P+(k)(Q)\}$ minutes, and that then continues with M minute-ranges $R_j$ each extending from $\{P+(N)(Q)+(j-1)(T)+1\}$ minutes to $\{P+(N)(Q)+(j)(T)\}$ minutes, where k=1, 2, 3, . . . , N, where j=1, 2, 3, . . . , M, where Q is a number of minutes, and where T is a number of minutes greater than Q. More particularly, in this schedule, P=300, Q=25, T=50, N=14, and M=12.

Further, the cost that this schedule sets forth for the first minute-range could be represented as a value C, with the cost for the next N subsequent minute-ranges $R_k$ being represented as a value C+(k)(G), and with the cost for the following M minute ranges $R_j$ being represented as a value C+(N)(G)+(j)(G), where G is an incremental cost. More particularly, in this schedule, C=$35.00 and G=$2.50.

The banded-pricing schedule of FIG. 3, on the other hand, begins with a lowest range of 0 to 300 minutes, then continues with 25-minute ranges through a high end of 950 minutes. For the first minute-range, the schedule assigns a cost of $35.00, for each minute-range through the 625:650 range, the schedule increases the monthly cost by $3.00, and for each subsequent minute-range, the schedule increases the monthly cost by just $1.50.

Algorithmically, this second schedule is an example of one that has a first minute-range of 0 to P minutes, that then continues with N minute-ranges $R_k$ each extending from $\{P+(k-1)(Q)+1\}$ minutes to $\{P+(k)(Q)\}$ minutes, and that then continues with M minute-ranges $R_j$ each extending from $\{P+(N)(Q)+(j-1)(Q)+1\}$ minutes to $\{P+(N)(Q)+(j)(Q)\}$ minutes, where k=1, 2, 3, . . . , N, where j=1, 2, 3, . . . , M, and where Q is a number of minutes. More particularly, in this schedule, P=300, Q=25, N=14, and M=12.

Further, the cost that the schedule of FIG. 3 sets forth for the first minute-range could be represented as a value C, with the cost for the next N subsequent minute-ranges $R_k$ being represented as a value C+(k)(G), and with the cost for the following M minute ranges $R_j$ being represented as a value C+(N)(H)+(j)(H), where G is an incremental cost, and where H is an incremental cost less than G. More particularly, in this schedule, C=$35.00, G=$3.00, and H=$1.50 (i.e., H is half of G).

Although the examples shown in FIGS. 2 and 3 provide for variation in the incremental cost increase per minute-range after a certain number of minute-ranges or variation in the size of minute-ranges after a certain number of minute-ranges, it is possible that all of the minute-ranges could be the same size and/or that all of the minute-ranges could provide for the same incremental cost increase.

Further, other variations in the structure of the banded-pricing schedule are possible as well. For instance, after a first number of minute-ranges, the size of the minute-ranges might decrease, and after a second number of minute-ranges, the size of the minute-ranges might decrease further. As another example, after a first number of minute-ranges, the incremental cost increase per minute-range might decrease, and after a second number of minute-ranges, the incremental cost increase per minute-range might decrease further. And as yet another example, the lowest minute-range could span the same number of minutes as each of the other minute ranges.

As shown in FIG. 1, the banded-pricing schedule can be stored in a database external to the pricing subsystem 42, such as in a file server that is part of the billing system 24. Alternatively, the banded-pricing schedule could be stored in data storage (e.g., ROM or hard disk storage) of the pricing subsystem 42. Further, backup copies could be provided for redundancy.

To apply the banded-billing process, the pricing subsystem 42 will determine how many minutes of telecommunication service a given subscriber used in a billing period (such as a monthly or quarterly) and will then query the banded-pricing schedule 50 to determine (i) which minute-range the number of minutes falls into and (ii) the specified cost for that minute-range. The pricing subsystem 42 will then record that cost as a charge in the subscriber's account record.

The pricing subsystem 42 can be arranged to determine the number of minutes used by the subscriber in the billing period in various ways. For instance, if the usage subsystem 40 has already provided a total number of minutes of use in the subscriber account record, then the pricing subsystem 42 can determine the number of minutes by reading that total from the account record. As another example, the pricing subsystem 42 can itself total up the subscriber's minutes of use for the billing period, based on the MOU calculations that the usage subsystem 40 recorded in the account record. The pricing subsystem 42 can further apply special rules in determining how many minutes of use the subscriber used in the period. For instance, the pricing subsystem 42 could disregard minutes of use for particular types of calls (e.g., customer service calls or mobile-to-mobile calls) or for other reasons, or the pricing subsystem 42 could provide various promotional discounts or other adjustments.

The total number of minutes that the pricing subsystem 42 (or other aspects of billing system 24 or network 10) determines a subscriber used in a given billing period does not need to be an exact representation of the quantity of service actually used by the subscriber in that period, although it is preferably a very close approximation. For instance, as noted above, the determination could involve rounding of call durations or making other adjustments of the number of minutes. The end result, in any event, is a determination of number of minutes used or more generally a determination of a number of minutes of communication service use attributable to the subscriber in the period at issue.

Once the pricing subsystem 42 has determined the number of minutes of use for the given subscriber during the billing period, the pricing subsystem 42 then queries the banded-pricing schedule 50 to determine which minute-range the number of minutes falls into and to determine the price that the schedule specifies for that minute-range.

By way of example, referring to the banded-pricing schedule of FIG. 2, if the subscriber used 662 minutes in the billing period, then the pricing subsystem 42 will determine that the subscriber's use falls into the minute-range of 651:700 and that the specified cost for that minute-range is $72.50. Alternatively, if the subscriber used 1,045 minutes the billing period, then the pricing subsystem 42 will determine that the use falls into the minute-range of 1001:1050 and that the specified cost for that minute-range is $90.00. Still alternatively, if the subscriber used 390 minutes in the billing period, then the pricing subsystem 42 will determine that the use falls into the minute-range of 376:400 and that the specified cost for that minute-range is $45.00.

The pricing subsystem 42 will then store in the subscriber's account record an indication of the determined cost for billing period. Further, the pricing subsystem 42 may record other charges to the subscriber's account, such as taxes, fees and surcharges that might be prescribed by law, and may apply various discounts to the determined cost.

In turn, the billing subsystem 44 may then produce an invoice to send to the subscriber for the billing period. For instance, the billing subsystem 44 may produce an invoice that lists MOU per call during the billing period, a total number of minutes determined to have been used during the billing period, a determined cost for that use, and any adjustments to the total. In accordance with the present invention, as will be described more below, the billing system may further depict on the invoice (i) the series of minute-ranges defined by the banded-pricing schedule and (ii) at the depicted series, a visual marker highlighting the minute-range into which the subscriber's use fell. The billing subsystem 44 may then send the invoice to the subscriber, by postal mail, e-mail or in some other manner.

Figure 4:
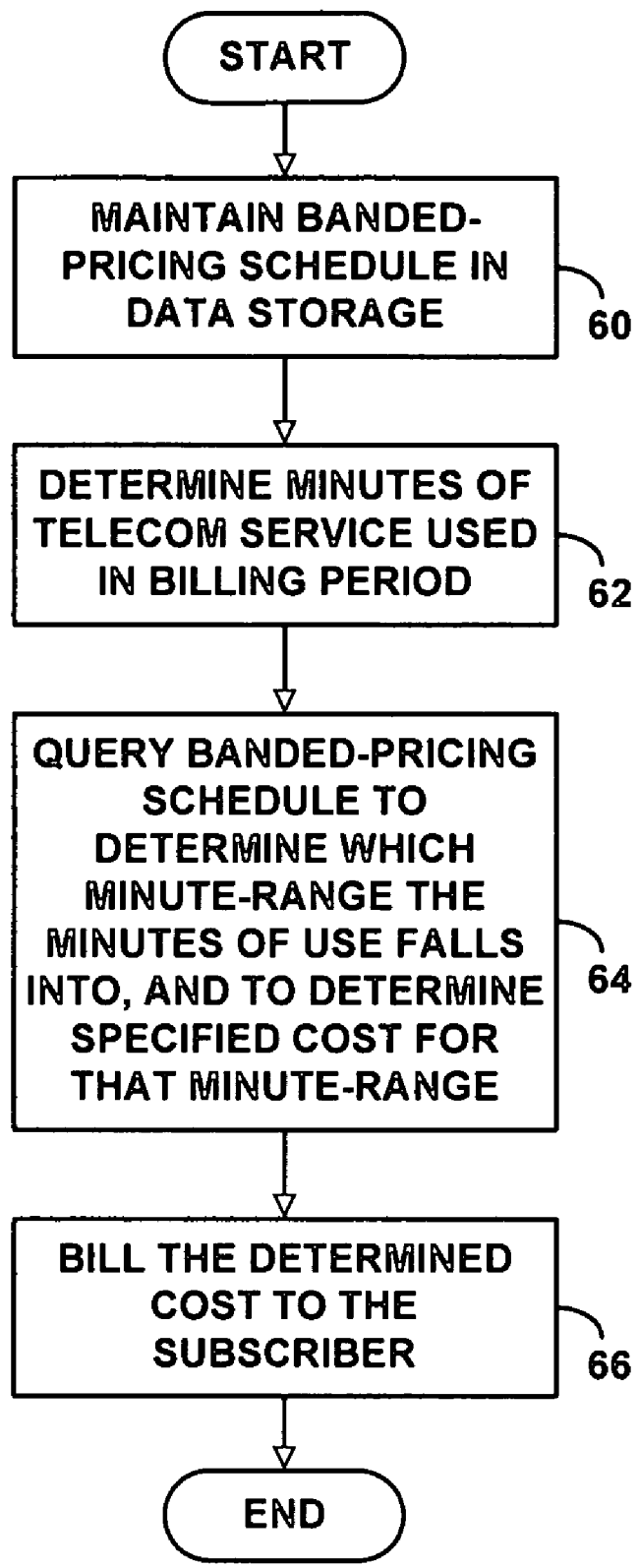
FIG. 4 is a flow chart depicting functions that can be carried out in accordance with a time-based banded billing process.

FIG. 4 is a flow chart summarizing functions of the time-based banded-billing system as described above. As shown in FIG. 4, at block 60, the billing system 24 maintains in data storage a banded-pricing schedule that divides a continuum of minutes into a series of contiguous, mutually-exclusive minute-ranges and that specifies for each minute-range a respective cost. At block 62, the billing system 24 determines a number of minutes of telecommunication service used by a given subscriber during a given period. At block 64, the billing system 24 then queries the banded-pricing schedule to determine which minute-range the number of minutes falls into, and to determine the cost specified by the banded-pricing schedule for that minute-range. In turn, at block 66, the billing system 24 bills the determined cost to the given subscriber, for use of the telecommunication service during the given period. (This billing function could comprise recording the determined cost (or some variant thereof) in the subscriber's account record, and it could further comprise sending an invoice to the subscriber to request payment.)

Although this discussion of time-based banded billing has assumed that a subscriber's use will be measured in increments of minutes, it should be understood that the extent of use could be measured in other time increments as well. For instance, subscriber use could be measured in (i) seconds or other fractions of minutes, (ii) groups of minutes, (iii) hours, or (iv) some other time increments.

Thus, considering "increments" in place of "minutes" in the discussion above, billing system 24 could (a) maintain a banded-pricing schedule that divides a continuum of increments of use into a series of contiguous, mutually-exclusive increment-ranges and that specifies for each increment-range a respective cost, (b) determines a number of increments of use of telecommunication service by a given subscriber during a given period, (c) queries the banded-pricing schedule to determine which increment-range the number of increments falls into, and to determine the cost specified by the banded-pricing schedule for that increment-range, and (d) bills the determined cost to the given subscriber, for use of the telecommunication service during the given period.

b. Data-Quantity-Based Banded Billing

Figure 5:
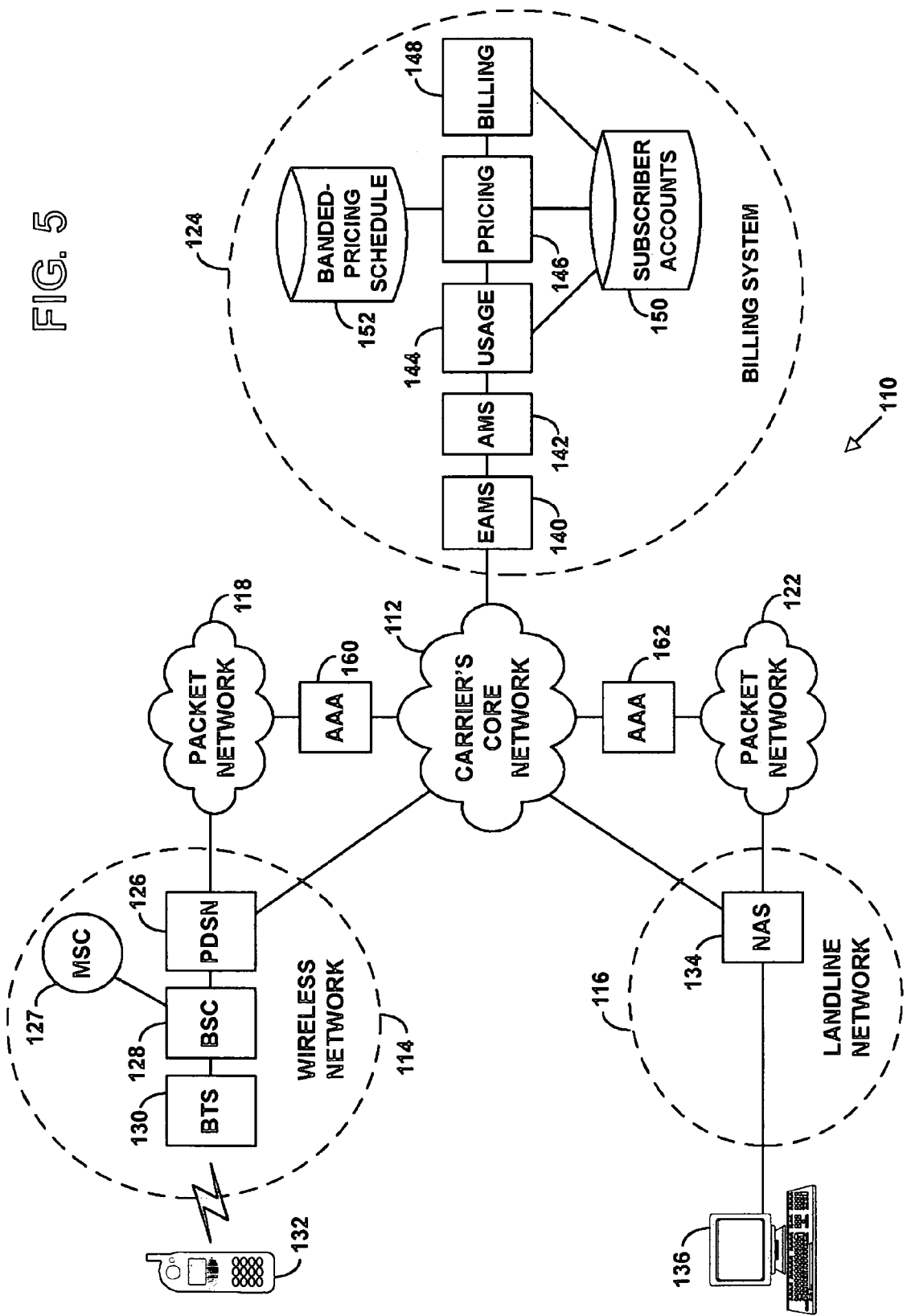
FIG. 5 is another block diagram of a telecommunication network in which an embodiment of the invention can be carried out.

Data-quantity-based banded billing can similarly be carried out by a telecommunication service provider (carrier) or other entity, in order to charge subscribers for use of telecommunication service in a given period of time, such as monthly, bimonthly or quarterly, for instance. FIG. 5 depicts an example telecommunication network 110 that could be owned and operated by a service provider in order to provide telecommunication service and to carry out the banded billing functions of the invention.

Example network 110 of FIG. 5 includes a carrier's core network 112, such as an ATM and/or IP-based network. Connected with the core network 112 is then one or more access networks/systems, such as a wireless access network 114 and a landline access network 116, each of which may allow subscribers to engage in data telecommunication services such as web browsing, voice-over-IP, e-mail communication, or others. Each of the access networks is coupled, in turn, with one or more data transport networks 118, 122, which could be the public Internet or could be private packet-switched networks operated by the carrier (e.g., integrated with core network 112).

Also connected with the core network 112 is a billing system 124, which preferably carries out the banded billing functions, as will be described in detail below. In addition, sitting on the core network are one or more authentication, authorization and accounting (AAA) servers 160, 162, which may function to pass usage information to the billing system to facilitate billing, as will also be described more below.

Each of the access networks shown by way of example in FIG. 5 includes a gateway or analogous entity that functions to provide connectivity between subscriber stations and transport networks, such as networks 118, 122. For instance, the wireless access network 114 includes a packet data serving node (PDSN) 126, which, together with a BSC 128 and BTS 130, provides connectivity between one or more wireless subscriber stations (e.g., WCD 132) and one or more transport networks. And the landline access network 116 includes a network access server (NAS) 134, which provides connectivity between one or more landline subscriber stations (e.g., personal computer 136) and one or more transport networks.

Wireless access network 114 may, more specifically, take the form of a cellular radio access network, like the wireless access network 14 described above with respect to FIG. 1. Further, although FIG. 5 depicts in wireless access network 114 a single PDSN, a single MSC, a single BSC and a single BTS, it should be understood that more than one of each might exist. Further, in some implementations, these components could be integrated together in various combinations.

Landline access network 116, on the other hand, may comprise a local area network, such as an enterprise network, a packet-cable distribution system, a cable modem distribution system, a digital subscriber line (DSL) distribution system, or the like, which provides connectivity between landline subscriber stations and NAS 134. Alternatively, landline access network 116 may comprise a landline telephone system that provides dial-up connectivity between landline subscriber stations and NAS 134. Although NAS 134 is shown between landline subscriber station 136 and transport network 122, NAS 134 could equally reside on transport network 122 so that communication between the subscriber station and the NAS traverses the transport network. Still other arrangements are possible as well.

In practice, a gateway such as PDSN 126 or NAS 134 may receive requests from subscriber stations to engage in data communication and may responsively grant those requests, and data communication to and from the subscriber stations may then pass through the gateway. For example, in the wireless access network 114, PDSN 126 may receive an origination message provided from WCD 132 (via BTS 130 and BSC 128), seeking to establish packet-data connectivity. In response, PDSN 126 may negotiate with the WCD 132 to establish a data-link layer connection and the PDSN or a mobile-IP home agent (not shown) may assign an IP address for the WCD 132 to use in communications on the transport network 118. Packet data communications to and from the WCD 132 may then flow through the PDSN 126.

Similarly, in the landline access network 116, NAS 134 may receive a request from personal computer 136 to establish connectivity with packet-data network, and NAS 134 may establish a data-link layer connection with the computer 136 and assign an IP address for the computer 136 to use in communications on transport network 122. Packet data communications to and from the computer 136 may then flow through the NAS 134.

Although not shown in FIG. 5, note that other gateways or similar entities may be present in the telecommunication network 110 as well. For instance, other access networks may be coupled by respective gateways with transport networks. Or data communications may be made to pass through one or more other gateways or similar entities on one or more other transport networks or elsewhere.

Conventionally, a gateway (such as a PDSN or NAS, for instance) will also track and report subscriber usage, to facilitate billing and performance monitoring. To do so, for each data session that passes through the gateway, the gateway may generate and send Usage Data Records (UDRs) to a designated AAA server. More particularly, at the start of the session, the gateway may send a START UDR, at the end of the session, the gateway may send a STOP UDR, and periodically during the session, the gateway may send other UDRs. Each UDR may be compliant with the RADIUS (Remote Authentication Dial In User Service) protocol and may provide information such as a session ID, a subscriber ID, the subscriber's assigned IP address, and the number of bytes of data communicated so far during the session. Each UDR is typically formatted as a database record with predefined fields.

A gateway may be programmed to record data quantities in each UDR with various increments and with a desired level of accuracy. For instance, a gateway could be programmed to record the quantity of data communicated as a number of bytes or a number of kilobytes. As another example, a gateway could be programmed to round data quantity to the nearest whole byte or kilobyte and to record that whole increment count in the UDR. Further, a gateway may be programmed to record a special data quantity for particular sessions. For instance, a gateway could be programmed to record a quantity of zero increments of data for sessions of a certain type, such as data sessions between one of the carrier's subscriber's and the carrier's customer service system or between a subscriber and one or more other designated network entities, or for sessions that experienced system disconnects. Other examples are possible as well.

Typically each gateway will be programmed to send its UDRs to a particular AAA server. To serve geographically dispersed gateways, a carrier may thus provide numerous AAA servers, each of which may collect UDRs from various gateways.

Periodically, or in response to a triggering event (such as receipt of each UDR, or receipt of a request from the billing system 124), each AAA server may programmatically send to the billing system 124 the UDRs that it has received. Based on the UDRs, subscriber service plans, and perhaps other data, the billing system 124 will then compute and apply charges to subscriber accounts. On a recurring basis, such as every month, every other month, or quarterly, for instance, the billing system may then generate subscriber invoices and send the invoices to subscribers for payment.

Billing system 124 can take various forms. In a preferred embodiment as with the billing system 24 of FIG. 1, for instance, the billing system 124 may comprise a number of subsystems, each of which could take the form of one or more programmed computers (e.g., computers with microprocessors and data storage (e.g., one or more volatile or non-volatile storage media, in one or more computers or other devices), and with machine language instructions (program logic) stored in the data storage and executable by the microprocessors), and all of which could reside on a local area network or could be connected together in some other way. As shown by way of example in FIG. 5, the subsystems may include an Enhanced Accounting Management System (EAMS) 140, an Accounting Mediation System (AMS) 142, a usage subsystem 144, a pricing subsystem 146, and a billing subsystem 148. Further, the billing system 124 may include a subscriber account store 150 to hold subscriber accounts, such as records of usage and service plan and payment information.

The EAMS 140 may function to aggregate UDRs from multiple AAA servers, on a session-by-session basis. This can be important in a mobile communication system, where subscriber stations move from access network to access network during the course of a given session, since in that case multiple AAA servers may provide UDRs for a common session. For each session, the EAMS 140 may periodically generate and send to the AMS 142 an IP Data Record (IPDR), which specifies a session ID, a subscriber ID, and the quantity of data communicated so far in the session.

The AMS 142 in turn may function to aggregate IPDRs that it receives from the EAMS 140. For instance, for each session, the AMS 142 may periodically generate and send to the usage subsystem 144 an incremental IPDR that specifies a session ID, a subscriber ID, and the quantity of data communicated since the last IPDR that the AMS 142 sent to the usage subsystem 144 for the session.

Upon receipt of each IPDR from the AMS 142, the usage subsystem 144 may determine from the IPDR the quantity of data communicated so far in the session. The usage subsystem may then record that data quantity into the appropriate subscriber account record in account store 150.

Given an IPDR, the usage subsystem 144 could be arranged to determine quantity of data communication in various ways, possibly depending on the type of information provided in the IPDR and upon one or more other factors. For instance, the usage subsystem 144 could consider the data quantity indicated by the IPDR to be the quantity of data communicated. Alternatively, the usage subsystem 144 could manipulate the data quantity indicated by the IPDR in some way, such as by rounding the indicated data quantity in a final IPDR for a session to the nearest whole increment of bytes, kilobytes, or other unit of measure (thus effectively treating any partial increment as a whole increment.) Further, the usage subsystem 44 may refer to subscriber profile records (which might be stored in account store 150 or elsewhere) to determine if special data quantity adjustments should be made for particular subscribers or for particular types of sessions. Still further, the usage subsystem 144 might perform different data quantity adjustments depending on time, day, date, or other factors.

As the usage subsystem 144 records the quantity of data communicated for a given session into the appropriate record in account store 150, the usage subsystem 144 may update a total number of increments of data communicated for that account during the current billing period (e.g., month, quarter, etc.) Alternatively, the usage subsystem 144 may simply record in the subscriber account an indication of the total number of increments together per session.

At the end of the billing period for the subscriber or at another designated time, the pricing subsystem 146 will next apply a banded-billing process so as to determine a charge for the increments of data communicated by the subscriber (e.g., to and/or from the subscriber) during the billing period. Note that, for a given subscriber account, the pricing subsystem 142 could perform this function separately for different categories of data sessions, such as for wireless, landline, voice-over-IP, web browsing, or other sorts of sessions, and the pricing subsystem 46 could produce separate charges for each category of sessions. Alternatively, the pricing subsystem 146 could perform this function cumulatively for all types of sessions, thus producing a cumulative charge to the subscriber.

In order to carry out the banded-billing process, the billing system will preferably maintain in data storage a banded-pricing schedule 150, which specifies increment-ranges and respective costs. More particularly, the banded-pricing schedule 150 will preferably take the form of a stored table that divides a continuum of increments of data into a series of contiguous, mutually-exclusive increment-ranges and that specifies for each increment-range a respective cost. The increments can be bits, bytes, words, kilobytes, megabytes, packets, cells, or other units of data.

Preferably, the continuum of increments of data will start at a low end of zero increments and extend to a designated high end. For instance, the continuum may extend from zero kilobytes to 18,000 kilobytes. Further, each of a plurality of the increment-ranges listed in the table (e.g., every increment-range) will preferably span multiple increments, such as 500 or 1,000 kilobytes for instance. Yet further, the various increment-ranges in the table can be the same size as each other or can vary in size from each other.

FIGS. 6 and 7 illustrate some example banded-pricing schedules for data-quantity-based banded billing, although it should be understood that other examples are possible as well. Like the example tables of FIGS. 2 and 3, each table of FIGS. 6 and 7 is structured with three columns and multiple rows, with each row identifying a particular increment-range and specifying a respective monthly cost for the increment-range. More particularly, for each increment-range, the first and second columns set forth the upper and lower limits of the increment-range and the third column sets forth the cost for use that falls within those limits.

The banded-pricing schedule of FIG. 6 begins with a lowest range of 0 to 5,000 kilobytes, then continues with 500-kilobyte ranges through 11,500 kilobytes, and then continues with 1,000-kilobyte ranges through 24,000 kilobytes. For the first kilobyte-range, the schedule assigns a cost of $10.00, and for each subsequent kilobyte-range, the schedule increases the monthly cost by $0.75.

Algorithmically, like the schedule of FIG. 2, this schedule is an example of one that has a first increment-range of 0 to P increments, that then continues with N increment-ranges $R_k$ each extending from $\{P+(k-1)(Q)+1\}$ increments to $\{P+(k)(Q)\}$ increments, and that then continues with M increment-ranges $R_j$ each extending from $\{P+(N)(Q)+(j-1)(T)+1\}$ increments to $\{P+(N)(Q)+(j)(T)\}$ increments, where k=1, 2, 3, . . . , N, where j=1, 2, 3, . . . , M, where Q is a number of increments, and where T is a number of increments greater than Q. More particularly, in this schedule, P=5,000 kilobytes, Q=500 kilobytes, T=1,000 kilobytes, N=14, and M=12.

Further, as with the schedule of FIG. 2, the cost that this schedule sets forth for the first increment-range could be represented as a value C, with the cost for the next N subsequent increment-ranges $R_k$ being represented as a value $C+(k)(G)$, and with the cost for the following M increment-ranges $R_j$ being represented as a value $C+(N)(G)+(j)(G)$, where G is an incremental cost. More particularly, in this schedule, C=$10.00 and G=$0.75.

The banded-pricing schedule of FIG. 7, on the other hand, begins with a lowest range of 0 to 5,000 kilobytes, then continues with 500-kilobyte ranges through a high end of 18,000 kilobytes. For the first kilobyte-range, the schedule assigns a cost of $10.00, for each kilobyte-range through the 11,501:12,000 range, the schedule increases the monthly cost by $1.00, and for each subsequent kilobyte-range, the schedule increases the monthly cost by just $0.50.

Algorithmically, like the schedule of FIG. 3, this second schedule is an example of one that has a first increment-range of 0 to P increments, that then continues with N increment-ranges $R_k$ each extending from $\{P+(k-1)(Q)+1\}$ increments to $\{P+(k)(Q)\}$ increments, and that then continues with M increment-ranges $R_j$ each extending from $\{P+(N)(Q)+(j-1)(Q)+1\}$ increments to $\{P+(N)(Q)+(j)(Q)\}$ increments, where k=1, 2, 3, . . . , N, where j=1, 2, 3, . . . , M, and where Q is a number of increments. More particularly, in this schedule, P=5,000 kilobytes, Q=500 kilobytes, N=14, and M=12.

Further, as with the schedule of FIG. 3, the cost that the schedule of FIG. 7 sets forth for the first increment-range could be represented as a value C, with the cost for the next N subsequent increment-ranges $R_k$ being represented as a value $C+(k)(G)$, and with the cost for the following M increment ranges $R_j$ being represented as a value $C+(N)(H)+(j)(H)$, where G is an incremental cost, and where H is an incremental cost less than G. More particularly, in this schedule, C=$10.00, G=$1.00, and H=$0.50 (i.e., H is half of G).

Similar to the examples of FIGS. 2 and 3, although the examples shown in FIGS. 6 and 7 provide for variation in the incremental cost increase per increment-range after a certain number of increment-ranges or variation in the size of increment-ranges after a certain number of increment-ranges, it is possible that all of the increment-ranges could be the same size and/or that all of the increment-ranges could provide for the same incremental cost increase.

Further, as with the examples above, other variations in the structure of the banded-pricing schedule are possible as well. For instance, after a first number of increment-ranges, the size of the increment-ranges might decrease, and after a second number of increment-ranges, the size of the increment-ranges might decrease further. As another example, after a first number of increment-ranges, the incremental cost increase per increment-range might decrease, and after a second number of increment-ranges, the incremental cost increase per increment-range might decrease further. And as yet another example, the lowest increment-range could span the same number of increments as each of the other increment-ranges.

As shown in FIG. 5, the banded-pricing schedule can be stored in a database 152 external to the pricing subsystem 146, such as in a file server that is part of the billing system 124. Alternatively, the banded-pricing schedule could be stored in data storage (e.g., ROM or hard disk storage) of the pricing subsystem 146. Further, backup copies could be provided for redundancy.

To apply the banded-billing process, the pricing subsystem 146 will determine how many increments of data a given subscriber communicated (e.g., sent and/or received) in a billing period (such as a monthly or quarterly) and will then query the banded-pricing schedule 150 to determine (i) which increment-range the number of increments falls into and (ii) the specified cost for that increment-range. The pricing subsystem 142 will then record that cost as a charge in the subscriber's account record.

The pricing subsystem 142 can be arranged to determine the number of increments used by the subscriber in the billing period in various ways. For instance, if the usage subsystem 144 has already provided a total number of increments of use in the subscriber account record, then the pricing subsystem 146 can determine the number of increments by reading that total from the account record. As another example, the pricing subsystem 146 can itself total up the subscriber's increments of use for the billing period, based on the usage that the per-session (or other) usage that subsystem 144 recorded in the account record. The pricing subsystem 146 can further apply special rules in determining how many increments of data the subscriber communicated in the period. For instance, the pricing subsystem 146 could disregard increments of data communicated for particular types of sessions or for other reasons, or the pricing subsystem 146 could provide various promotional discounts or other adjustments.

The total number of increments of data that the pricing subsystem 146 (or other aspects of billing system 124 or network 110) determines a subscriber communicated in a given billing period does not need to be an exact representation of the quantity of data actually communicated by the subscriber in that period, although it is preferably a very close approximation. For instance, as noted above, the determination could involve rounding of increments or making other adjustments of the number of increments. The end result, in any event, is a determination of number of increments used or more generally a determination of a number of increments of communication service use attributable to the subscriber in the period at issue.

Once the pricing subsystem 146 has determined the number of increments of use for the given subscriber during the billing period, the pricing subsystem 142 then queries the banded-pricing schedule 150 to determine which increment-range the number of increments falls into and to determine the price that the schedule specifies for that increment-range.

By way of example, referring to the banded-pricing schedule of FIG. 6, if the subscriber communicated 12,662 kilobytes of data in the billing period, then the pricing subsystem 146 will determine that the subscriber's use falls into the increment-range of 12,001:13,000 and that the specified cost for that increment-range is $21.25. Alternatively, if the subscriber communicated 19,045 kilobytes of data in the billing period, then the pricing subsystem 146 will determine that the use falls into the increment-range of 19,001:20,000 and that the specified cost for that increment-range is $26.50. Still alternatively, if the subscriber communicated 6,590 kilobytes of data in the billing period, then the pricing subsystem 146 will determine that the use falls into the increment-range of 6,501:7,000 and that the specified cost for that increment-range is $13.00.

The pricing subsystem 146 will then store in the subscriber's account record an indication of the determined cost for billing period. Further, as with pricing subsystem 46 in FIG. 1, the pricing subsystem 146 of FIG. 5 may record other charges to the subscriber's account, such as taxes, fees and surcharges that might be prescribed by law, and may apply various discounts to the determined cost.

In turn, the billing subsystem 148 may then produce an invoice to send to the subscriber for the billing period. For instance, the billing subsystem 144 may produce an invoice that lists the number of increments of data communicated per session during the billing period, a total number of increments of data determined to have been communicated during the billing period, a determined cost for that data communication, and any adjustments to the total. In accordance with the present invention, as will be described more below, the billing system may further depict on the invoice (i) the series of increment-ranges defined by the banded-pricing schedule and (ii) at the depicted series, a visual marker highlighting the increment-range into which the subscriber's use fell. The billing subsystem 148 may then send the invoice to the subscriber, by postal mail, e-mail or in some other manner.

Figure 8:
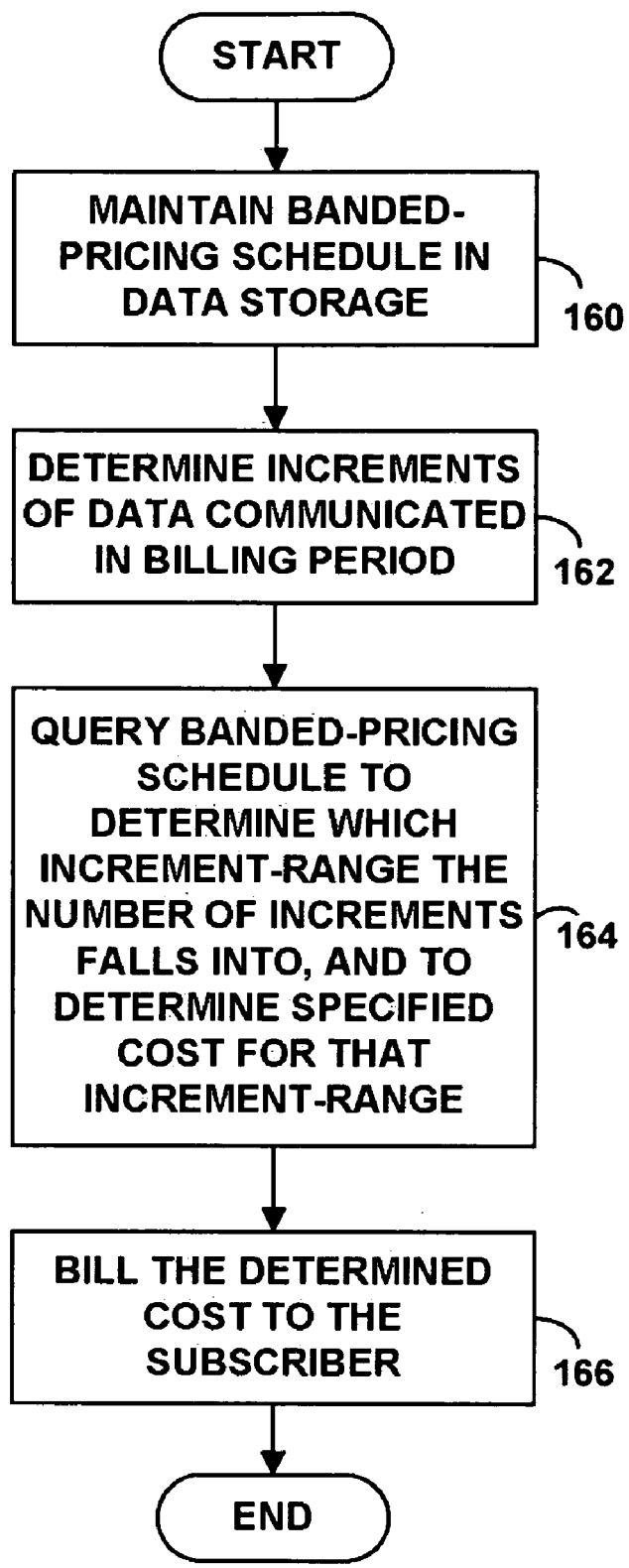
FIG. 8 is a flow chart depicting functions that can be carried out in accordance with a data-quantity-based banded billing process.
Figure 9:

FIG. 8 is a flow chart summarizing functions of the data-quantity-based banded-billing system as described above. As shown in FIG. 8, at block 160, the billing system 124 maintains in data storage a banded-pricing schedule that divides a continuum of increments of data into a series of contiguous, mutually-exclusive increment-ranges and that specifies for each increment-range a respective cost. At block 162, the billing system 124 determines a number of increments of data communicated by a given subscriber during a given period. At block 164, the billing system 124 then queries the banded-pricing schedule to determine which increment-range the number of increments falls into, and to determine the cost specified by the banded-pricing schedule for that increment-range. In turn, at block 166, the billing system 124 bills the determined cost to the given subscriber, for use of the telecommunication service during the given period. (This billing function could comprise recording the determined cost (or some variant thereof) in the subscriber's account record, and it could further comprise sending an invoice to the subscriber to request payment.)

2. Generating Invoice with Visual-Gauge of Increment-Ranges

According to the exemplary embodiment, the billing system or other entity that generates an invoice for a given subscriber will include on the invoice a visual gauge to help the subscriber quickly understand where in the continuum of possible increment-ranges the subscriber's use fell. In a preferred embodiment, for instance, the invoice may list or otherwise depict the series of possible increment-ranges (e.g., minute-ranges or data-quantity-increment ranges) as defined by the banded-pricing schedule and may specify for each depicted increment-range the respective cost defined by the banded-pricing schedule. The invoice may then further include at the depicted series a visual marker that highlights (e.g., in gray, in a contrasting color, or in a different font or other emphasis), points-to (e.g., as an arrow, carrot, bracket, icon, or other marker), or otherwise designates the particular increment-range into which the subscriber's use fell. Upon receipt of such an invoice, the subscriber may thus readily see from the depicted visual gauge where in the continuum of possible increment-ranges the subscriber's use fell.

In the preferred embodiment, the billing system may further include on the invoice a summary section that specifically indicates the cost incurred for the range into which the subscriber's use fell, possibly together with other information of interest, such as taxes, surcharges, and the like, or other information regarding the subscriber's service plan.

As noted above, a billing system 24, 124, or more particularly a billing subsystem 44, 144, may be programmed with processor-executable logic to generate the inventive subscriber invoice. More particularly, the billing system may be programmed with logic to generate an invoice that depicts a visual gauge as described above, including the series of possible increment-ranges and the visual marker pointing out the increment-range into which the subscriber's use fell. The billing system may generate the invoice as an electronic document, such as a PDF or HTML document that depicts the invoice, and the billing system may store the electronic document in data storage. Further, the billing system may print the document as a paper invoice for the subscriber, and the service provider may mail or otherwise deliver the paper copy to the subscriber. Alternatively, the service provider may e-mail or otherwise deliver the electronic version of the invoice to the subscriber.

FIGS. 9-13 show examples of electronic or printed invoices generated in accordance with the improved process. Note that the invoices show incremental costs for each range; in an alternative embodiment, the invoices can show the total cost (including any base cost) for each range. The example invoices use grayscale highlighting as the visual indication the increment-range into which the subscriber's use fell; as noted above, other visual markers could be used instead. Note also that, as shown on the examples where the subscriber's use fell beyond the highest range of the series, the system can structure the invoice to visually highlight or otherwise point out both the highest range and an overage-range. Alternatively, in such an instance, the system can highlight or otherwise point out just the overage-range. Further, although the examples of FIGS. 9-13 depict minute-ranges, it should be understand that the concepts apply as well to any other sorts of increment-ranges, whether time-based, data-quantity-based, or based on other units.

Figure 14:
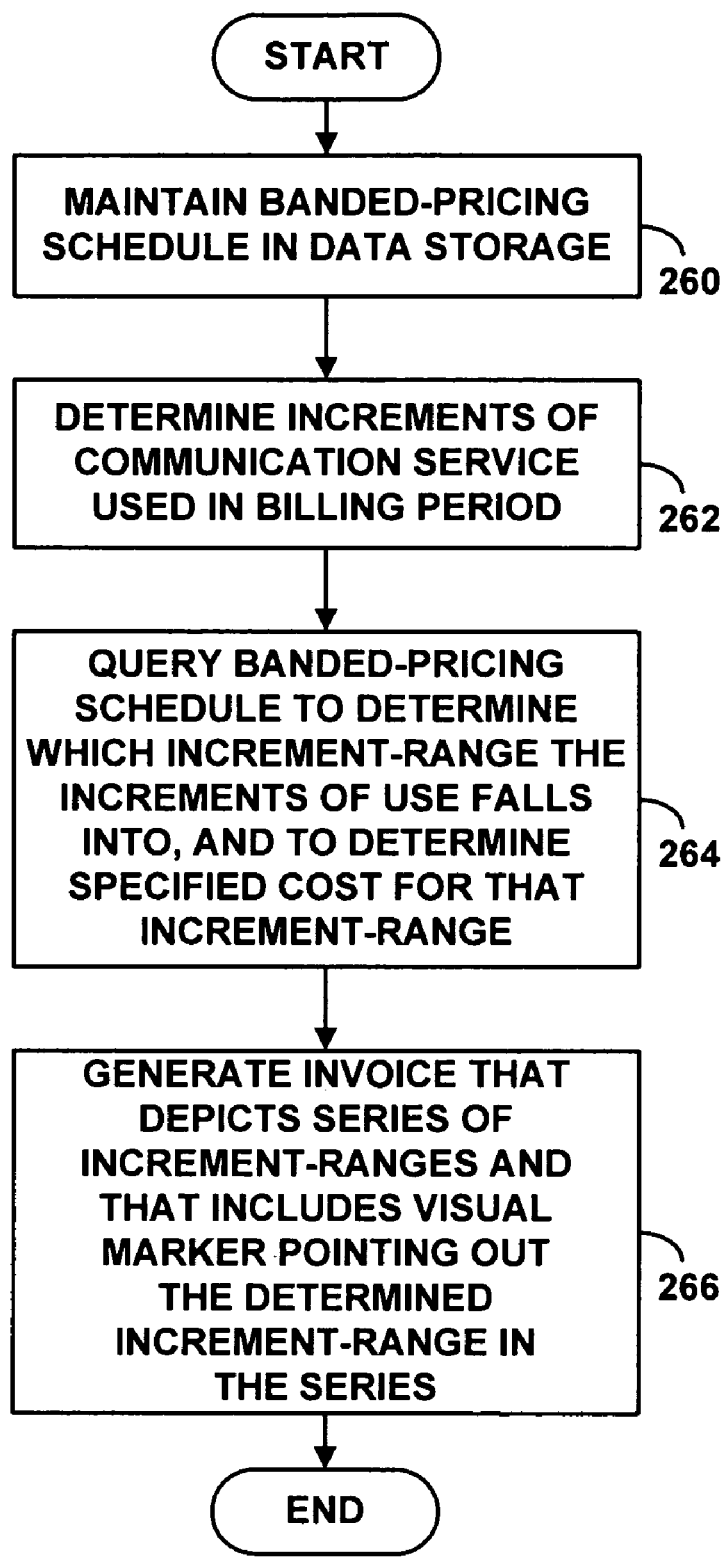
FIG. 14 is a flow chart depicting functions that can be carried out in accordance with the exemplary embodiment.

Finally, FIG. 14 is a flow chart summarizing functions of a banded-billing system in accordance with the exemplary embodiment, including generation of an invoice that depicts the inventive visual gauge. As shown in FIG. 14, at block 260, a billing system maintains in data storage a banded-pricing schedule that divides a continuum of increments of data into a series of contiguous, mutually-exclusive increment-ranges and that specifies for each increment-range a respective cost. At block 262, the billing system determines a number of increments of communication service attributable to a given subscriber during a given period. At block 264, the billing system then queries the banded-pricing schedule to determine which increment-range the number of increments falls into, and to determine the cost specified by the banded-pricing schedule for that increment-range. In turn, at block 266, the billing system generates for the given subscriber an invoice that depicts the series of increment-ranges and that includes at the depicted series a visual marker pointing out the determined increment-range in the series.

3. Conclusion

An exemplary embodiment of the present invention has been described above. Those skilled in the art will understand, however, that changes and modifications may be made to the embodiment described without departing from the true scope and spirit of the invention, which is defined by the claims.

What is claimed is:

1. A banded billing method for communication service comprising:
   maintaining in data storage a banded-pricing schedule that divides a continuum of increments of communication service into a series of contiguous, mutually-exclusive increment-ranges and that specifies for each increment-range a respective cost;
   determining a number of increments of communication service attributable to a given subscriber during a given period;
   querying the banded-pricing schedule to determine which increment-range the number of increments falls into, and to determine the cost specified by the banded-pricing schedule for that increment-range;
   generating for the given subscriber an invoice that depicts the series of increment-ranges and that includes at the depicted series a visual marker pointing out the determined increment-range in the series,
   wherein the series of increment-ranges begins with a first increment-range of 0 to P increments and then continues with increment-ranges $R_k$ each extending from $\{P+(k-1)(Q)+1\}$ increments to $\{P+(k)(Q)\}$ increments wherein k=1, 2, 3, . . . , N, and wherein Q is a number of increments.

2. The banded billing method of claim 1, wherein the invoice depicts the series of increment-ranges and the respective cost for each depicted increment-range, and wherein the visual marker points out the determined increment-range and the respective cost for the determined increment-range.

3. The banded billing method of claim 1, wherein the invoice depicts the series of increment-ranges as a table in which a first column designates increment-range and a second column designates respective cost.

4. The banded billing method of claim 1, wherein the visual marker comprises grayscale highlighting of the determined increment-range in the series.

5. The banded billing method of claim 1, wherein the visual marker comprises color highlighting of the determined increment-range in the series.

6. The banded billing method of claim 1, wherein the visual marker comprises a graphical pointer to the determined increment-range in the series.

7. The banded billing method of claim 1, wherein the increment-ranges are ranges of time increments.

8. The banded billing method of claim 7, wherein the time increments are minutes.

9. The banded billing method of claim 1, wherein the increment-ranges are ranges of data-quantity increments.

10. The banded billing method of claim 1, wherein each of a plurality of the increment-ranges defined by the banded-pricing schedule spans a plurality of increments.

11. The banded billing method of claim 1, wherein, after N increment-ranges following the first increment-range, the series of increment-ranges continues with increment-ranges $R_j$, each extending from $\{P+(N)(Q)+(j-1)(T)+1\}$ increments to $\{P+(N)(Q)+(j)(T)\}$ increments, wherein j=1, 2, 3, . . . , M, and wherein T is a number of increments greater than Q.

12. The banded billing method of claim 1, wherein generating the invoice comprises printing the invoice on paper, the method further comprising sending the printed invoice to the subscriber.

13. The banded billing method of claim 1, wherein generating the invoice comprises generating an electronic document depicting the invoice, the method further comprising sending the electronic document to the subscriber.

14. The banded billing method of claim 1, further comprising:
   including in the invoice a summary section that lists as an incurred cost the respective cost of the determined increment-range.

15. The banded billing method of claim 1, wherein multiple subscriber communication devices share a billing account, and wherein the increments of communication attributable to the given subscriber during the given period include a total of increments of communication attributable to the multiple subscriber communication devices during the given period.

16. The banded billing method of claim 1, wherein the communication service comprises wireless communication service.

17. The banded billing method of claim 1, wherein determining the number of increments of communication service attributable to the given subscriber during the given period comprises extracting usage records generated by one or more switches, gateways, or other serving nodes.

* * * * *

UNITED STATES PATENT AND TRADEMARK OFFICE
CERTIFICATE OF CORRECTION

PATENT NO. : 7,603,103 B1  Page 1 of 1
APPLICATION NO. : 11/406753
DATED : October 13, 2009
INVENTOR(S) : Mau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 816 days.

Signed and Sealed this

Fifth Day of October, 2010

David J. Kappos
*Director of the United States Patent and Trademark Office*